(12) United States Patent
Spicer et al.

(10) Patent No.: US 9,921,582 B2
(45) Date of Patent: Mar. 20, 2018

(54) RECONFIGURABLE AUTOMATED GUIDED VEHICLE SYSTEM

(71) Applicant: GM GLOBAL TECHNOLOGY OPERATIONS LLC, Detroit, MI (US)

(72) Inventors: John P Spicer, Plymouth, MI (US); Ningjian Huang, Bingham Farms, MI (US); Greg Vanderheyden, Lake Orion, MI (US); James O'Dell, Auburn Hills, MI (US)

( * ) Notice: Subject to any disclaimer, the term of this patent is extended or adjusted under 35 U.S.C. 154(b) by 0 days.

(21) Appl. No.: 15/133,287

(22) Filed: Apr. 20, 2016

(65) Prior Publication Data

US 2017/0308084 A1  Oct. 26, 2017

(51) Int. Cl.
*G05D 1/00* (2006.01)
*B62B 5/00* (2006.01)

(52) U.S. Cl.
CPC ......... *G05D 1/0088* (2013.01); *B62B 5/0083* (2013.01)

(58) Field of Classification Search
CPC .......... G05D 1/0088; G05D 2201/0216; Y10T 29/49622; B62B 5/0083
See application file for complete search history.

(56) References Cited

U.S. PATENT DOCUMENTS

| | | | |
|---|---|---|---|
| 4,947,094 A * | 8/1990 | Dyer ...................... | G05D 1/024 180/168 |
| 6,104,314 A * | 8/2000 | Jiang ...................... | B60Q 9/004 340/436 |
| 8,016,303 B1 * | 9/2011 | Ullman ................. | B62B 5/0083 280/79.4 |
| 8,510,952 B2 * | 8/2013 | Amirehteshami .... | B23P 21/002 29/897.2 |
| 8,527,153 B2 * | 9/2013 | Doan .................... | G05D 1/0891 198/463.1 |
| 8,661,684 B1 * | 3/2014 | Boyd ...................... | B21D 53/92 29/407.1 |
| 8,983,649 B2 * | 3/2015 | Checketts ............. | G05D 1/0265 700/213 |
| 9,090,357 B2 * | 7/2015 | Oberoi .................. | B64F 5/0009 |
| 2009/0128139 A1 * | 5/2009 | Drenth ................... | G01R 33/02 324/207.22 |
| 2010/0086385 A1 * | 4/2010 | Shani ...................... | E04H 6/245 414/232 |
| 2010/0183409 A1 * | 7/2010 | Checketts .............. | B60K 17/30 414/231 |

(Continued)

*Primary Examiner* — Krishnan Ramesh

(57) ABSTRACT

An automated guided vehicle system may include a plurality of automated guided vehicles arranged in a predetermined relationship with respect to each other for supporting a payload. Each of the automated guided vehicles has a plurality of rollers extending from the automated guided vehicle and engaging a ground surface. Furthermore, at least one locator extends from the automated guided vehicle and engages the payload. Each of the automated guided vehicles also has an on-board controller arranged within a housing thereof, with one on-board controller acting as a master controller and the remaining of the on-board controllers acting as slave controllers. The master controller communicates with the slave controllers to maintain position and speed control of each automated guided vehicle in both a lateral and a longitudinal direction. Furthermore, the slave controllers send feedback information to the master controller.

19 Claims, 3 Drawing Sheets

(56) References Cited

U.S. PATENT DOCUMENTS

| | | | | |
|---|---|---|---|---|
| 2014/0067184 A1* | 3/2014 | Murphy | ............... | G05D 1/0265 |
| | | | | 701/23 |
| 2014/0172223 A1* | 6/2014 | Murphy | ............... | G05D 1/0289 |
| | | | | 701/25 |
| 2014/0358338 A1* | 12/2014 | Harasaki | ........... | H01L 21/67715 |
| | | | | 701/19 |
| 2015/0286218 A1* | 10/2015 | Shani | .................... | B62B 5/0083 |
| | | | | 701/2 |

* cited by examiner

RECONFIGURABLE AUTOMATED GUIDED VEHICLE SYSTEM

FIELD

The present disclosure relates to an automated guided vehicle system that is reconfigurable for accommodating payloads of varied size, weight, and shape.

INTRODUCTION

The statements in this section merely provide background information related to the present disclosure and may not constitute prior art.

An automated guided vehicle (AGV) is an unmanned and/or self-propelled vehicle that is used to transport a payload along a route without real-time human assistance. Because an AGV operates with controlled navigation, it can eliminate the need for direct operator involvement (e.g., no human operator), thereby reducing the risks associated with operator-introduced error during movement. Movement of an AGV is typically along a guided path or route laid out in or on a facility floor, warehouse, distribution center, etc. The AGV can utilize a human controller interface (e.g., a joystick), optical sensors, magnetic sensors, electrical field sensors, a global positioning system (GPS), inertial guidance, and/or laser guidance for navigation along the desired path. The guidance system can dictate a precise and repeatable path for the AGV to follow, while the sensor systems can provide real-time updates for anything that encroaches upon the AGV's path of travel.

SUMMARY

An automated guided vehicle system includes a plurality of automated guided vehicles arranged in a predetermined relationship with respect to each other for supporting a payload. Each of the automated guided vehicles has a plurality of rollers extending from the automated guided vehicle and engaging a ground surface. Furthermore, at least one locator extends from the automated guided vehicle and engages the payload. Each of the automated guided vehicles also has an on-board controller arranged within a housing thereof, with one on-board controller acting as a master controller and the remaining of the on-board controllers acting as slave controllers. The master controller communicates with the slave controllers to maintain position and speed control of each automated guided vehicle in both a lateral and a longitudinal direction. Furthermore, the slave controllers send feedback information to the master controller.

Another automated guided vehicle system includes at least one automated guided vehicle for supporting a payload. Each automated guided vehicle has a plurality of rollers extending from the automated guided vehicle and engaging a ground surface. Furthermore, at least one locator extends from the automated guided vehicle and engages the payload. The at least one automated guided vehicle also has a force transducer associated with each of the locators for measuring a force on the associated locator for comparison to a baseline force. When the force exceeds the baseline force, the associated locator or the automated guided vehicle carrying the associated locator is moved in a direction that reduces the force on the locator to less than or equal to the baseline force.

A controller arrangement for a plurality of automated guided vehicles includes a master controller arranged on a first of the plurality of automated guided vehicles and a slave controller arranged on each of the remaining of the plurality of automated guided vehicles. The plurality of automated guided vehicles moves a payload from a first location to a second location. The master controller issues commands to the slave controllers to maintain position and speed control of the plurality of automated guided vehicles in both a lateral and a longitudinal direction for synchronously moving the payload from the first location to the second location.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
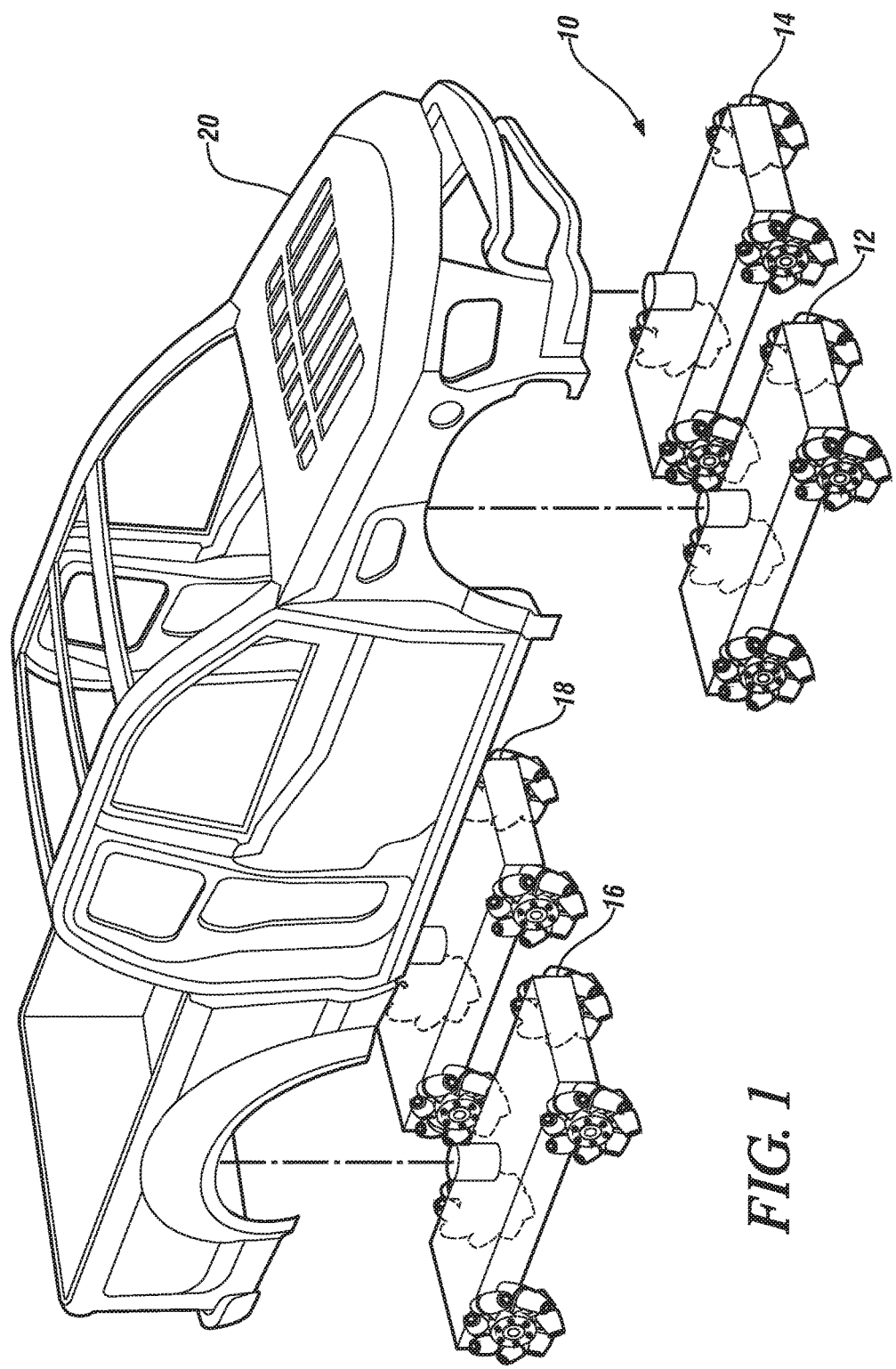
FIG. 1 is a perspective view of an exemplary automated guided vehicle system carrying a payload according to the present disclosure.

The following description is merely exemplary in nature and is not intended to limit the present disclosure, application, or uses. It should be understood that throughout the drawings, corresponding reference numerals indicate like or corresponding parts and features. Further, directions such as "top," "side," "back", "lower," and "upper" are used for purposes of explanation and are not intended to require specific orientations unless otherwise stated. These directions are merely provided as a frame of reference with respect to the examples provided, but could be altered in alternate applications.

Referring now to FIG. 1, an exemplary automated guided vehicle system 10 is shown. The automated guided vehicle system 10 includes four automated guided vehicles (AGVs) 12, 14, 16, 18 arranged in a quadrilateral pattern for supporting a payload 20. While described as AGVs, it should be understood that any type of self-guided and/or self-propelled vehicle can be used within the automated guided vehicle system 10 including, but not limited to, automated guided carts (AGC), laser guided vehicles (LGV), or vision guided vehicles (VGV). Furthermore, the payload 20 may be a workpiece or assembly (e.g., a vehicle chassis), such as shown in FIG. 1, or it may be quantities of completed parts, manufacturing fixtures, or any other payload that is too large to be moved by other conventional methods or that requires precision and control in delivery. The automated guided vehicle system 10, as described herein, may be beneficial for use in the automotive and aerospace manufacturing industries; the pulp and metal processing industries; the agricultural, military, appliance, construction, food and beverage, consumer products and medical service industries; and general manufacturing applications.

Figure 2:
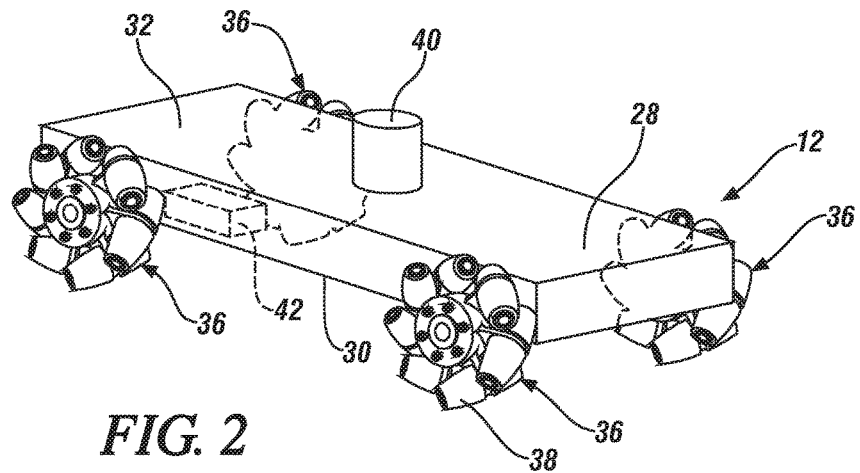
FIG. 2 is a perspective view of an automated guided vehicle (AGV) of the automated guided vehicle system of FIG. 1.

As each of the AGVs 12, 14, 16, 18 are similar in design, only AGV 12 will be described in detail herein. Referring now to FIG. 2, AGV 12 includes a body portion 28 having a lower portion 30 and an opposing upper portion 32. The lower portion 30 of the AGV 12 includes four wheels 36 extending therefrom for engaging a ground surface (e.g., plant floor). Each of the wheels 36 may be omnidirectional and may include a plurality of rollers 38 arranged to have a predetermined angular relationship with respect to the wheel axis (e.g., 45 degrees). The omnidirectional wheels 36 provide the AGV 12 with both forward and reverse, crabbing, and rotational movement capabilities, which may assist in maneuvering techniques used by the automated guided vehicle system 10 (e.g., maintaining formation). While omnidirectional wheels (e.g., mecanum wheels) are described and shown in the figures, it should be understood that wheels 36 may also be standard wheels or casters, crawler tracks, or a conveyor system.

The upper portion 32 of the AGV 12 may include at least one locator, such as pin 40 extending a predetermined distance above a top surface of the AGV 12. Each locator 40 arranged on the AGV 12 engages with the payload 20 at a predetermined datum location. In particular, the locator pin 40 may extend into a locator hole (not shown) on a surface of the payload 20 such that positioning of the payload 20 may be maintained during assembly and/or manufacturing operations. The locator pin 40 may be fixedly secured to the top surface of the AGV 12 or may be movably arranged thereon, as described in further detail below.

The body portion 28 of the AGV 12 also houses an on-board controller 42 for controlling movement of the AGV 12. On-board controller 42 utilizes distributed robotics technologies, which provides the ability for the on-board controller 42 to behave as a master controller communicating with slave controllers arranged on the other AGVs 14, 16, 18 and also as a master controller communicating with other master controllers from alternate automated guided vehicle systems moving through the manufacturing facility. Communication with alternate automated guided vehicle systems allows each of the systems to modify their route based on priorities when an obstacle is present on a normal route. Notably, all on-board controllers on the AGVs 12, 14, 16, 18 have the same computing capability, but only one of the four is assigned as the master controller in the system at any particular time. While a distributed robotics technology is described in detail herein, it should be understood that a centralized system may also be used for controlling movement of the AGVs 12, 14, 16, 18. In the centralized system, all AGVs communicate with a central controller, which in turn, determines traffic, conflict, malfunctions, etc. and relays appropriate control maneuvers to each AGV.

Figure 3:
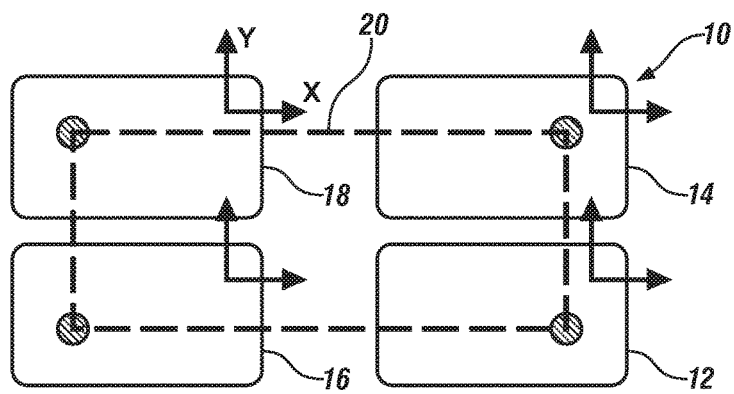
FIG. 3 is a schematic view of an automated guided vehicle system according to the present disclosure.

On-board controller 42 of the AGV 12, acting as the master controller, communicates with the slave controllers of the AGVs 14, 16, 18 to maintain position control of each of the AGVs 12, 14, 16, 18 in both a lateral and an longitudinal direction (see FIG. 3). The master controller is responsible for direction control (i.e., where each AGV is going) and speed control (i.e., how fast each AGV is moving). The position control allows each of the AGVs 12, 14, 16, 18 to move in unison for synchronous movement of the automated guided vehicle system 10. In other words, the AGVs 12, 14, 16, 18 cooperate to move in a formation (e.g., platoon or swarm) in order to provide the capability for highly efficient, fault tolerant operations. The ability to swarm or platoon the AGVs 12, 14, 16, 18 provides quick and easy reconfiguring of the automated guided vehicle system 10 in order to carry alternately-sized payloads or payloads with differently arranged datums without needing to purchase new hardware. The changes to the design of the formation are accomplished quickly through programming of the master on-board controller 42.

In contrast to the responsibilities of the master controller, the slave controllers are responsible for health-related tasks (e.g., equipment mechanical issues, state of charge, obstruction detection). As such, the slave controller can provide feedback information to the master controller 42 regarding system status, such as, but not limited to a system health status, a position and speed measurement, and an obstacle avoidance path. In response to this information, the master controller can halt the AGVs 12, 14, 16, 18 or sound/flash an alarm when the feedback information from the slave controllers indicates a health status failure. When the master controller experiences a failure, it can reassign its master status to one of the slave controllers. It is also possible for one of the slave controllers to override the master controller to halt the system, if required. Emergency stop (e-stop) functions are activated by all AGVs, such that a safety stop can override all other commands. Each of these features is accomplished through real-time communication between the master and slaves, which may be achieved by wireless transmissions systems, like radio frequency or infrared.

While four AGVs 12, 14, 16, 18 are shown in the formation of FIG. 3, it is possible to support the payload 20 with fewer or more AGVs. Furthermore, any of the AGVs may include additional supporting structures (e.g., rests) for part stability and positive part location. In one example shown in FIG. 4, an automated guided vehicle system 100 may include two AGVs 112, 116 arranged to support a trapezoidal-shaped payload 120. The AGVs 112, 116 may have differing elongated shapes for supporting the payload 120 and may each have two locator pins 140 arranged on an upper portion 132 thereof. The locator pins 140 may be fixedly secured to the upper portion 132 of the AGV 112, 116 or may be movably arranged thereon, as described in further detail below. The AGVs 112, 116 each include on-board controllers (not shown) with a master-slave arrangement as described above.

Figure 5:
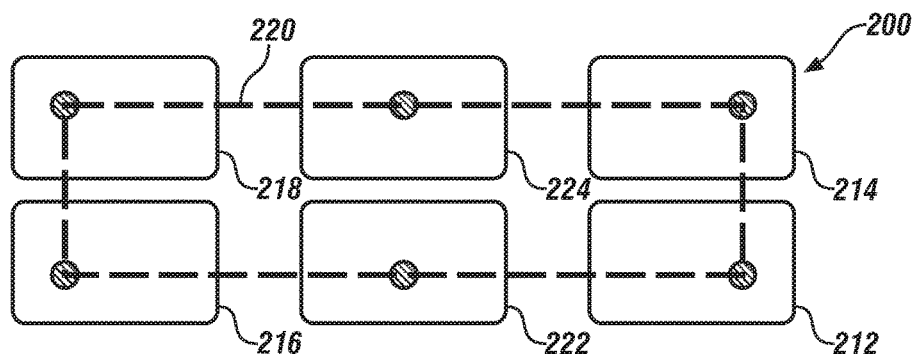
FIG. 5 is a schematic view of an automated guided vehicle system incorporating six AGVs.

In another example shown in FIG. 5, an automated guided vehicle system 200 may include six or more AGVs 212, 214, 216, 218, 222, 224 arranged to support an elongated payload 220. The augmented, central AGVs 222, 224 may provide additional stability and/or "positive" location to the payload 220 when required due, for example, to length and/or weight and/or material flexibility. In this way, the formation of the AGVs can be influenced by the shape and/or weight distribution of the payload 220. The AGVs 212, 214, 216, 218, 222, 224 each include locator pins and on-board controllers (not shown) with a master-slave arrangement as described above.

Figure 4:
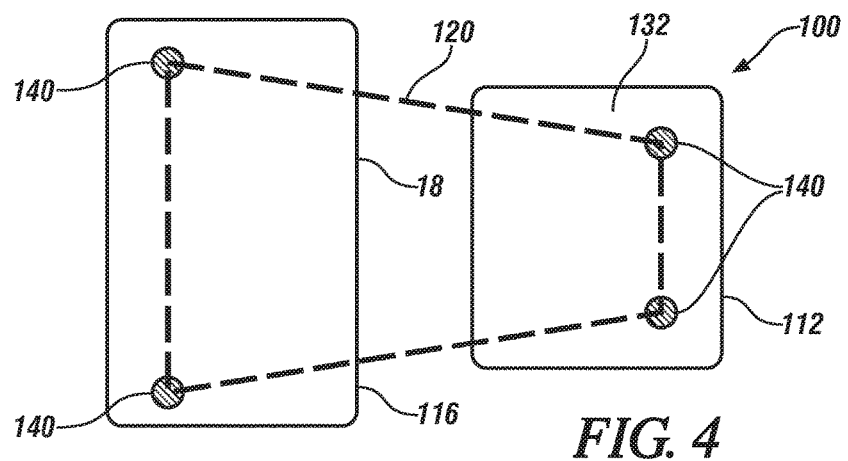
FIG. 4 is a schematic view of an automated guided vehicle system incorporating two AGVs.
Figure 6:
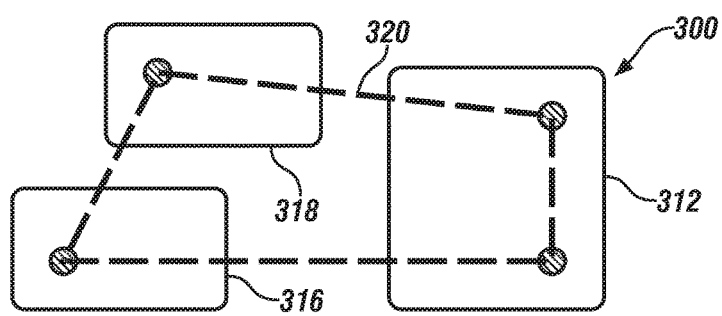
FIG. 6 is a schematic view of an automated guided vehicle system incorporating three AGVs.

Furthermore, while an even number of AGVs has been discussed, it is possible to also have an odd number of AGVs working cooperatively. In particular, and as shown in FIG. 6, an automated guided vehicle system 300 may include three AGVs 312, 316, 318 arranged in an irregular formation for supporting a payload 320. In this example, the first, elongated AGV 312 is centrally disposed underneath the front portion of the payload 320, while the second and third AGVs 316, 318 are arranged at a distance to each other at the rear portion of the payload 320. The AGVs 312, 316, 318 each include locator pins and on-board controllers (not shown) with a master-slave arrangement as described above. Utilizing the smaller AGV design, such as the example shown in FIGS. 1-3, may result in lower cost AGVs that provide greater flexibility for mixed payload sizes. Furthermore, a greater number of AGVs purchased may result in reduced costs due to economy of scale. However, with certain payloads it may be necessary to use the larger style AGV as shown in FIGS. 4 and 6 (e.g., when retooling existing equipment).

Figure 7:
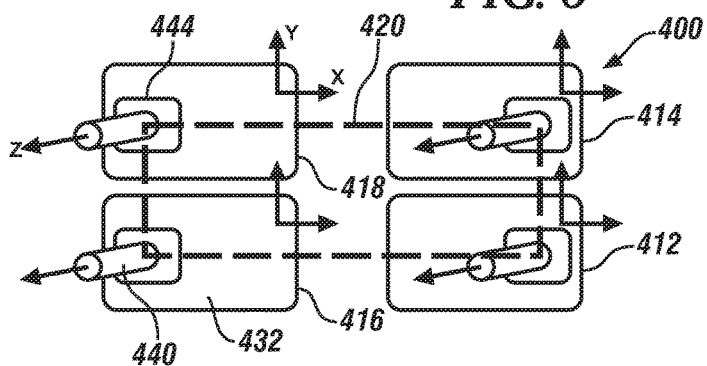
FIG. 7 is a schematic view of an automated guided vehicle system incorporating vertically movable locators.

With reference now to FIG. 7, another exemplary automated guided vehicle system 400 is shown. The automated guided vehicle system 400 includes four AGVs 412, 414, 416, 418 arranged in a quadrilateral pattern for supporting a payload 420. The AGVs 412, 414, 416, 418 are substantially similar to the AGVs 12, 14, 16, 18 and, therefore, will not be described in detail. Each of the AGVs 412, 414, 416, 418 includes an upper portion 432 supporting at least one locator pin 440 extending vertically a predetermined distance above the upper portion 432. The locator pins 440 differ from the locator pins 40 in that they are movable (e.g., movable in the z-direction). The locator pins 440 may extend on programmable actuators (not shown) in order to accommodate differences in locator heights. Furthermore, each of the locator pins 440 may be associated with a force transducer 444 for measuring a force acting on the associated locator pin 440. The force acting on the locator pin 440 may be due to the locator pin 440 being improperly aligned with respect to the datum surface on the payload 420 (e.g., not fully extending into a locator hole). The force acting on the locator pin 440 may also be attributed to the AGVs 412, 414, 416, 418 moving out of proper alignment. Accordingly, the master controller may receive the measured force acting on the associated locator pin 440 of each AGV and may compare it to a predetermined baseline force. When the measured force exceeds the baseline force, the locator pin 440, or the AGV 412, 414, 416, or 418 carrying the locator pin 440, can be moved in a direction that reduces the force on the locator pin 440 to less than or equal to the baseline force (e.g., in the x- or y-directions).

Figure 8:
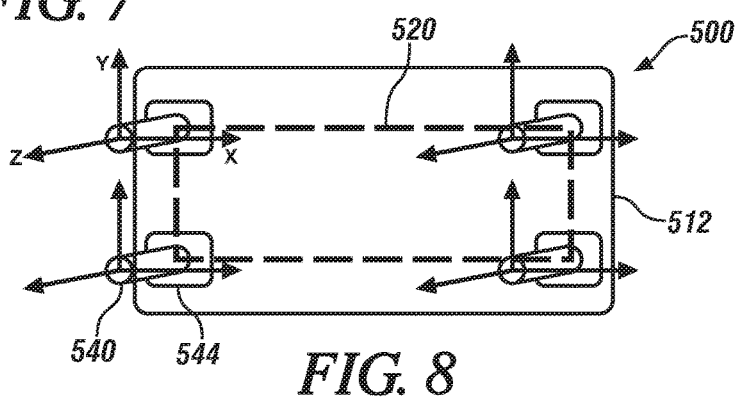
FIG. 8 is a schematic view of an automated guided vehicle incorporating three dimensionally movable locators.

Referring now to FIG. 8, an automated guided vehicle system 500 is shown having a single AGV 512 with four locator pins 540 for supporting a payload 520 arranged in a quadrilateral pattern thereon. The AGV 512 is substantially similar to the AGV 12 and, therefore, will not be described in detail. The locator pins 540 differ from the locator pin 40 in that they are movable in three dimensions (e.g., in the x-, y-, and z-directions). Each of the locator pins 540 may also be associated with a force transducer 544 for measuring a force acting on the associated locator pin 540, as described above. While the locator pins 540 are described as being arranged on the AGV 512, it should be understood that the locator pins 540 may also be arranged on a fixed geometry pallet riding on the AGV 512 or on a palletized conveyance system.

In each of the FIGS. 1 through 8, the payload 20, 120, 220, 320, 420, 520 behaves as a mechanical linkage between the AGVs of the system. It is contemplated, however, to provide an additional mechanical linkage between at least two of the AGVs of the system in order to provide additional accuracy in aligning the AGVs. The linkage may be movable in one direction (e.g., the length direction) and constrained in other directions (e.g., the cross-direction). In one example, the mechanical linkage may be a piston-rod assembly extending between two of the AGVs of the system.

Embodiments of the present disclosure are described herein. This description is merely exemplary in nature and, thus, variations that do not depart from the gist of the disclosure are intended to be within the scope of the disclosure. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for various applications. Various combinations and modifications of the features consistent with the teachings of this disclosure, however, could be desired for particular applications or implementations.

What is claimed is:

1. An automated guided vehicle system, comprising:
a plurality of automated guided vehicles arranged in a predetermined relationship with respect to each other for supporting a payload and having a mechanical linkage extending between at least two of the plurality of automated guided vehicles, wherein each of the automated guided vehicles includes:
a plurality of rollers extending from the automated guided vehicle and engaging a ground surface;
at least one locator extending from the automated guided vehicle and engaging the payload; and
an on-board controller arranged within a housing of the automated guided vehicle,
wherein one on-board controller is a master controller and the remaining of the on-board controllers are slave controllers, wherein the master controller communicates with the slave controllers to maintain position and speed control of each automated guided vehicle in both a lateral and a longitudinal direction, and wherein feedback information is sent from the slave controllers to the master controller, and wherein the mechanical linkage is a piston-rod assembly extending between at least two of the plurality of automated guided vehicles.

2. The automated guided vehicle system of claim 1, wherein the mechanical linkage is movable in a first direction and constrained from movement in a second direction, and wherein the first and second directions are perpendicularly arranged.

3. The automated guided vehicle system of claim 1, wherein the plurality of rollers are omnidirectional rollers.

4. The automated guided vehicle system of claim 1, wherein the plurality of automated guided vehicles includes four automated guided vehicles.

5. The automated guided vehicle system of claim 1, further comprising:
a force transducer associated with each locator for measuring a force on the associated locator for comparison to a baseline force, wherein when the force exceeds the baseline force, the associated locator or the automated guided vehicle carrying the associated locator is moved in a direction that reduces the force on the locator to less than or equal to the baseline force.

6. The automated guided vehicle system of claim 1, wherein the feedback information sent from the slave controllers to the master controller includes at least one of a system health status, a position and speed measurement, and an obstacle avoidance path.

7. The automated guided vehicle system of claim 6, wherein the master controller sends a signal to halt the plurality of automated guided vehicles or to provide an alarm when the feedback information from the slave controllers indicates a health status failure.

8. The automated guided vehicle system of claim 1, wherein the master controller reassigns a master status to one of the slave controllers.

9. An automated guided vehicle system, comprising:
   at least one automated guided vehicle for supporting a payload, wherein each automated guided vehicle includes:
      a plurality of rollers extending from the automated guided vehicle and engaging a ground surface;
      at least one locator extending from the automated guided vehicle and engaging the payload; and
      a force transducer associated with each of the locators for measuring a force on the associated locator for comparison to a baseline force, wherein when the force exceeds the baseline force, the associated locator or the automated guided vehicle carrying the associated locator is moved in a direction that reduces the force on the locator to less than or equal to the baseline force.

10. The automated guided vehicle system of claim 9, further comprising:
    a master controller that receives the force measurement from the force transducer, the master controller causing movement of the associated locator or the automated guided vehicle carrying the associated locator in the direction that reduces the force on the locator to less than or equal to the baseline force.

11. The automated guided vehicle system of claim 9, wherein the associated locator is movable in three dimensions.

12. The automated guided vehicle system of claim 9, wherein the associated locator is movable in a first direction and the automated guided vehicle carrying the associated locator is movable in second and third directions, and wherein the first, second, and third directions are perpendicularly arranged with respect to one another.

13. The automated guided vehicle system of claim 9, further comprising:
    a plurality of automated guided vehicles each including an on-board controller, wherein one on-board controller is a master controller and the remaining of the on-board controllers are slave controllers, wherein the master controller communicates with the slave controllers to maintain position and speed control of each automated guided vehicle in both a lateral and a longitudinal direction, and wherein feedback information is sent from the slave controllers to the master controller.

14. The automated guided vehicle system of claim 13, further comprising:
    a mechanical linkage extending between at least two of the plurality of automated guided vehicles.

15. The automated guided vehicle system of claim 14, wherein the mechanical linkage secures the plurality of automated guided vehicles for synchronous movement.

16. The automated guided vehicle system of claim 13, wherein the feedback information sent from the slave controllers to the master controller includes at least one of a system health status, a position and speed measurement, and an obstacle avoidance path.

17. The automated guided vehicle system of claim 13, wherein the master controller sends a signal to halt the plurality of automated guided vehicles or to provide an alarm when the feedback information from the slave controllers indicates a health status failure.

18. The automated guided vehicle system of claim 9, wherein the plurality of rollers are omnidirectional rollers.

19. A controller arrangement for a plurality of automated guided vehicles, comprising:
    a master controller arranged on a first of the plurality of automated guided vehicles; and
    a slave controller arranged on each of the remaining of the plurality of automated guided vehicles, wherein the plurality of automated guided vehicles are arranged to support a first payload to be moved from a first location to a second location, and wherein the master controller issues commands to the slave controllers to maintain position and speed control of the plurality of automated guided vehicles in both a lateral and a longitudinal direction for synchronously moving the first payload from the first location to the second location, and wherein the master controller issues commands to the slave controllers to reconfigure the plurality of automated guided vehicles to support a second payload having a different configuration than the first payload.

* * * * *